Aug. 5, 1969    A. E. STRAUS    3,459,231
REPAIR CLAMP
Filed March 2, 1966
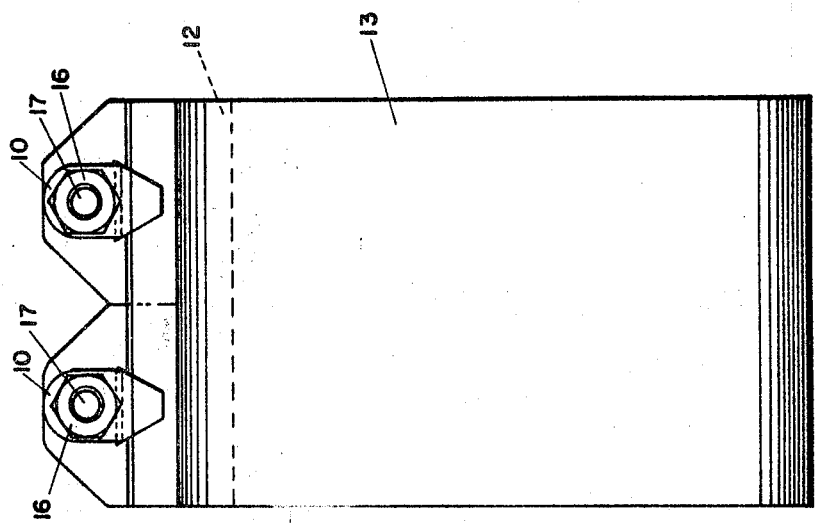
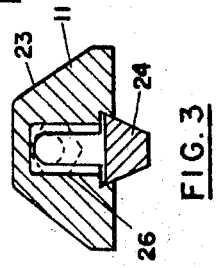
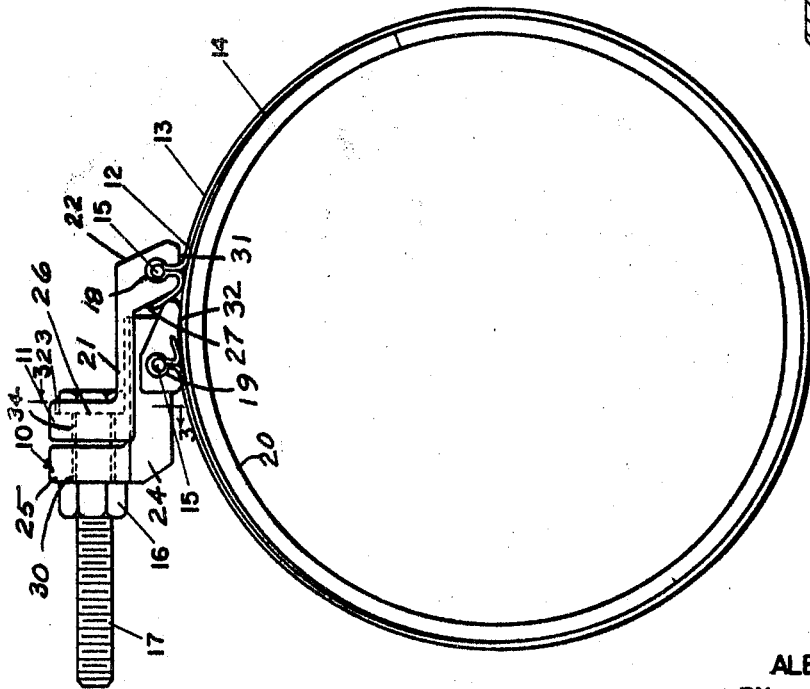
INVENTOR
ALBERT E. STRAUS
BY United States Patent Office 3,459,231
Patented Aug. 5, 1969

3,459,231
REPAIR CLAMP
Albert E. Straus, Erie, Pa., assignor to Morris Coupling and Clamp Company, Erie, Pa., a corporation of Pennsylvania
Filed Mar. 2, 1966, Ser. No. 531,262
Int. Cl. F16l 55/16
U.S. Cl. 138—99                    6 Claims

ABSTRACT OF THE DISCLOSURE

The clamp disclosed herein has a tensioning member and a saddle member that are attached to a pipe encircling band. The band is adapted to pull a gasket into sealing engagement with a leak in a pipe. The tensioning member and saddle member each have a keyhole shaped slot lying laterally. An end of the band is inserted in each of the keyhole shaped slots, and a pin placed into this end, so that the band is held in position. The tensioning member has a dovetail shaped member that cooperates with a similar surface on the saddle member, so that the tensioning member and saddle member are pulled toward each other in a straight path, thereby preventing bending.

---

It is an object of this invention to provide an improved clamp for pipes and the like.

Another object of the invention is to provide an improved structure for connecting the ends of a clamp.

A further object of the invention is to provide a clamp which is simple in construction, economical to manufacture, and simple and efficient to use.

Another object of the invention is to provide an improved coupling device.

Yet another object is to provide a coupling device which will compensate for differences in diameter of pipes and differences in alignment.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an end view of the invention shown supported on a pipe;

FIG. 2 is a side view of the clamp shown in FIG. 1; and

FIG. 3 is a cross sectional view taken on line 3—3 of FIG. 1.

Now with more particular reference to the drawing, the clamp shown has a band 13 made of relatively thin, flat material having its ends attached to a tensioning member 11 and the saddle 10. The band is preferably made of a suitable grade of steel, but it could be made from other metals or from suitable non-metallic materials. A bolt 17 extends through the hole 30 in the saddle member 10 and through a like hole in the tensioning member 11 and is held in place by means of a nut 16. The ends of the tensioning member 11 and the saddle member have keyhole shaped grooves 18 and 19, respectively, which terminate in an open side along surfaces 31 and 32 respectively, and these grooves each receive pins 15. The ends of the tensioning member 11 are bent around into the keyhole shaped grooves 18 and 19 and the pins 15 are received in the fold of the ends concentric with the round part of the grooves. Spanner member 12 has an inside surface that conforms to the outside shape of the pipe 20 including gasket thickness and is received between the ends of the tensioning member and the saddle member. The outside surface of the spanner member 12 has a slightly lesser radius of curvature than the radius of the pipe 20. The spanner member 12 is received between the ends of the band 13 and the pipe. Thus, the spanner member 12 forms a smooth surface for the tensioning member and the saddle member to slide on.

The tensioning member 11 has a first leg 21, a third leg 22, and a second leg 23 integrally attached together.

The saddle member 10 has a first leg 24, and a second leg 25, integrally connected together and disposed at right angles to each other. The leg 24 has a dovetail portion 38 that is slidably received in dovetail slot 37 in leg 23. The second leg of the saddle member has a hole 30 therein which aligns with keyhole slot 34 in the tensioning member 11. The keyhole slot 34 has counter slots 26, both of which terminate in an open lower end and which receive the head of bolt 17. The third leg 22 of the tensioning member has a surface 27 around which the end of the band 13 is bent to better hold it in position. The leg 22 of the tensioning member extends laterally of the first leg 21 to a width approximately equal to the width of band 13. Thus, legs 21 and 22 are disposed at right angles to each other and form a T shape when viewed from the top.

To assemble, the ends of the band having been bent to fit into the keyhole grooves 18 and 19 thereby forming a loop with cylindrical openings for pins 15, are put into the keyhole slots and the pins 15 are put into place in the openings. The length of band 13 is proportioned so that the legs 23 and 25 are spaced from each other when in place. As the nut 16 is tightened, the ends of the band are pulled together, clamping them on the pipe. A suitable gasket indicated at 14 may be disposed between the band, the spanner member, and the pipe. The gasket will seal any leaks in the pipe covered by it. Two saddle members and two tensioning members may be attached side by side to a single band as shown in FIG. 2 for suitably connecting wide bands. It will be understood that several such saddles and tensioning members could be attached to a very wide band to accomplish like results.

The foregoing specification sets forth the invention in its preferred practical forms but the structure shown is capable of modification within a range of equivalents without departing from the invention which is to be understood is broadly novel as is commensurate with the appended claims.

1. A clamp for use on a pipe or the like comprising
a flat, relatively thin band having a first end and a second end,
a saddle,
said saddle having a first leg and a second leg integrally attached together and disposed generally at right angles to each other,
a tensioning member,
said tensioning member having a first leg, a second leg, and a third leg all integrally attached together,
said first leg of said tensioning member having a surface slidably engaging said first leg of said saddle,
said first leg of said saddle being disposed in general tangential relation to a pipe when said clamp is installed thereon,
said band being adapted to encircle said pipe,
a bolt hole in said second leg of said saddle,
a slot in said second leg of said tensioning member,
a bolt in said slot and in said bolt hole for pulling said second legs toward each other,
means attaching said first end of said band to said tensioning member,
means attaching said second end of said band to said first leg of said saddle,
a dovetail like slot in said tensioning member, and a dovetail like male member on said saddle received in said dovetail like slot in said tensioning member whereby said tensioning member is restrained to move in a path parallel to said surface on said tensioning member and parallel to a tangent to said pipe.

2. The clamp recited in claim 1 wherein said means attaching said band to said tensioning member and said saddle comprise a keyhole shaped groove in said first leg of said saddle generally perpendicular to said bolt,
a keyhole shaped groove in said first leg of tensioning member generally parallel to said groove in said saddle,
a loop formed on said first end of said band,
said loop disposed in one said keyhole shaped groove and said second end disposed in the other said keyhole shaped groove,
a first pin in said first loop,
and a second pin in said second loop.

3. The clamp recited in claim 1 wherein
a second said clamp is provided in combination with said first mentioned clamp,
both said clamps having a saddle and a tensioning member,
said first pin extending through both said grooves in said tensioning members,
said second pin extending through said grooves in said saddles.

4. The clamp recited in claim 3 wherein said combination is disposed on a pipe, a spanner member is disposed between the said ends of said band and said pipe,
said spanner member having an inside surface conforming to a part of the outside of said pipe,
and an outside surface on said spanner member having a radius of curvature slightly less than the radius of said pipe,
the ends of said spanner member terminiating in a relatively sharp edge.

5. The clamp recited in claim 1 wherein
said slot terminates in an open end at the side of said tensioning member adjacent said saddle member.

6. The clamp recited in claim 5 wherein
said second leg of said tensioning member has a counter slot adjacent said slot wherein the head of said bolt is received.

References Cited
UNITED STATES PATENTS

| | | | |
|---|---|---|---|
| 1,931,730 | 10/1933 | Klay | 269—243 XR |
| 2,443,271 | 6/1948 | Russell | 138—99 |
| 2,897,568 | 8/1959 | Hoke | 138—99 XR |
| 2,980,143 | 4/1961 | Harris | 138—99 |
| 2,998,629 | 9/1961 | Smith | 138—99 XR |
| 3,151,632 | 10/1964 | Risley et al. | 138—99 |
| 3,189,970 | 6/1965 | Barr | 138—99 XR |
| 3,204,665 | 9/1965 | Faint | 138—99 |

LAVERNE D. GEIGER, Primary Examiner

I. C. WADDEY, JR., Assistant Examiner